United States Patent [19]

Pinchemaille

[11] 4,394,908
[45] Jul. 26, 1983

[54] TOOL MAGAZINE FOR AUTOMATIC TOOL-CHANGING DEVICE

[75] Inventor: Pierre Pinchemaille, Albert, France

[73] Assignee: Line S.A., Albert, France

[21] Appl. No.: 238,603

[22] Filed: Feb. 26, 1981

[30] Foreign Application Priority Data

Mar. 26, 1980 [FR] France .................................. 80 06758

[51] Int. Cl.³ .......................... B23Q 3/157; B23Q 13/00
[52] U.S. Cl. ......................................... 211/1.5; 29/568
[58] Field of Search ................. 29/568, 26 A; 221/82, 221/86; 211/1.5

[56] References Cited

U.S. PATENT DOCUMENTS

| | | | |
|---|---|---|---|
| 3,650,018 | 3/1972 | Perry et al. | 29/568 |
| 4,069,918 | 1/1978 | Inoue et al. | 211/1.5 |
| 4,156,962 | 6/1979 | Haller | 29/568 |
| 4,306,350 | 12/1981 | Kielma et al. | 29/568 |

Primary Examiner—Z. R. Bilinsky
Attorney, Agent, or Firm—Schwartz, Jeffery, Schwaab, Mack, Blumenthal & Koch

[57] ABSTRACT

The invention relates to a tool magazine for automatic tool-changing device, comprising a circular disc mounted for rotation about a pin and comprising on its periphery a series of housings designed to receive the tools whose axes are directed according to the radii of the disc.

At least one secondary disc is rotatably mounted co-axially to the main disc on which secondary disc are hingedly mounted, about an axis perpendicular to a radius of the secondary disc, members for supporting the secondary housings designed to receive the tools, the said secondary housings being adapted to be selectively pivotally engaged in an opening provided in the wall of the main disc.

The invention is used for storing tools.

8 Claims, 4 Drawing Figures

TOOL MAGAZINE FOR AUTOMATIC TOOL-CHANGING DEVICE

BACKGROUND OF THE INVENTION

1. Field of the Invention

The present invention relates to a tool magazine for an automatic tool changing device. Machine-tools, and in particular milling-machines can often be provided with an automatic tool changing device generally equipped with two mechanical means:

(a) A tool-changing device adapted to remove the tool mounted in the spindle of the machine and to replace it with another tool taken from a tool magazine.

(b) A tool magazine.

2. Prior Art

The present invention relates to the magazine in which the tools are stored.

Amongst the different magazines that are known already, there is one of a special design which is shown in FIGS. 1 and 2 and which consists of a circular disc 1 mounted for rotation about a pin 2, said disc 1 comprising on its periphery a series of spaced housings 3 for receiving the tools 4, the axes 5 of which are arranged along the radii of the disc 1.

Said magazine is completed by different devices for driving the disc 1 into rotation, for stopping it in order to present the selected tool to the changing position, for locking and unlocking the said tool, etc. . . , all these known devices not forming part of the invention.

The magazine mentioned hereinabove is relatively simple and inexpensive, compared for example with other devices wherein the different housings constitute an endless chain. The number of available housings on the other hand is limited by the acceptable diameter of the disc, in relation to the space available.

OBJECTS AND SUMMARY OF THE INVENTION

It is the object of the present invention to overcome this disadvantage whilst retaining all the advantages of the disc magazine.

According to the present invention, at least one secondary disc is mounted to rotate co-axially with the main disc, on which secondary disc are hingedly mounted, about an axis perpendicular to a radius of the secondary disc, members for supporting the secondary housings designed to receive the tools, the said secondary housings being adapted to be selectively pivotally engaged in an opening provided in the wall of the main disc where one of the housings normally provided on said disc is situated.

The main advantage of this arrangement is to allow the presentation of the tools of the upper magazine and those of the lower magazine in a similar position for the loading and unloading of the tools by the arm of the changing device. It becomes thus possible to store a large number of tools in a restricted space by using a relatively simple mechanical device.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
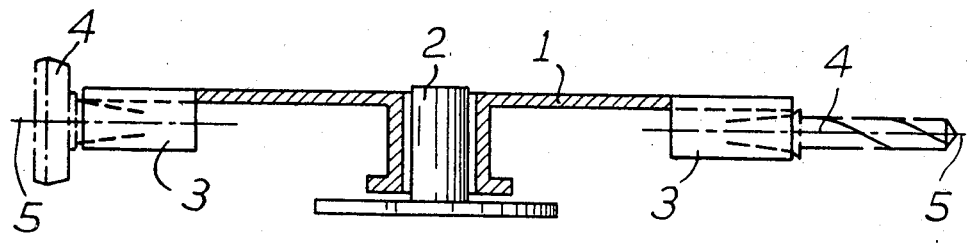
FIG. 1 is an elevational view of a radial cross-section of a tool magazine of a known type.
Figure 2:
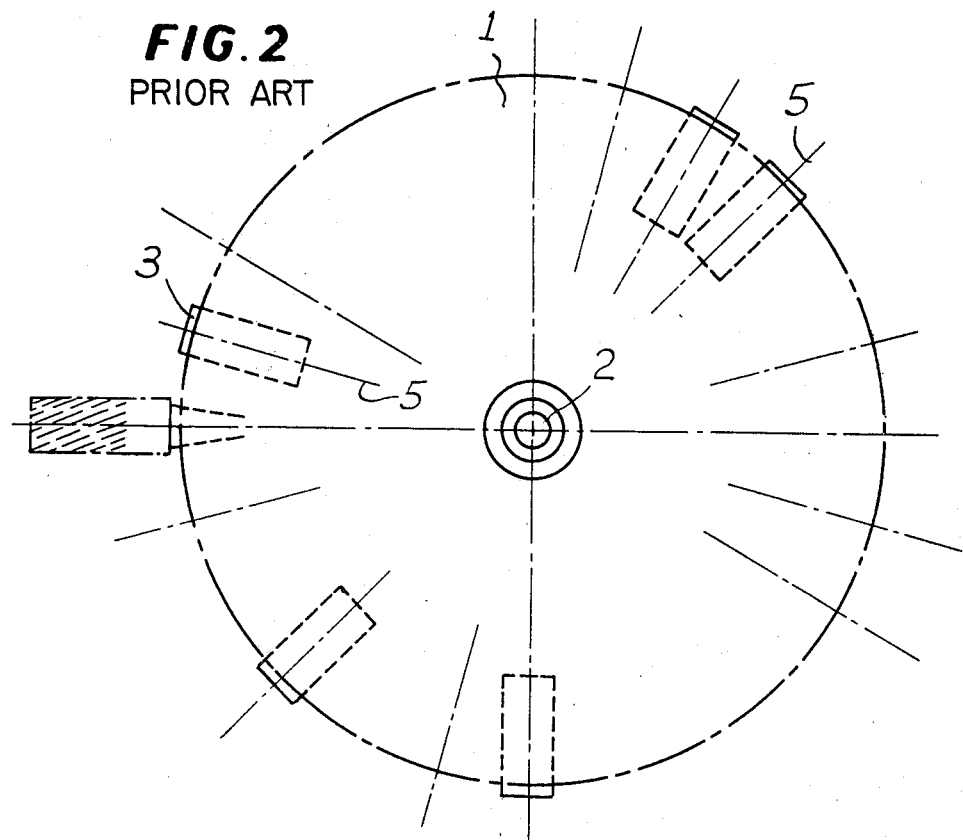
FIG. 2 is a plan view of the known tool magazine illustrated in FIG. 1.
Figure 3:
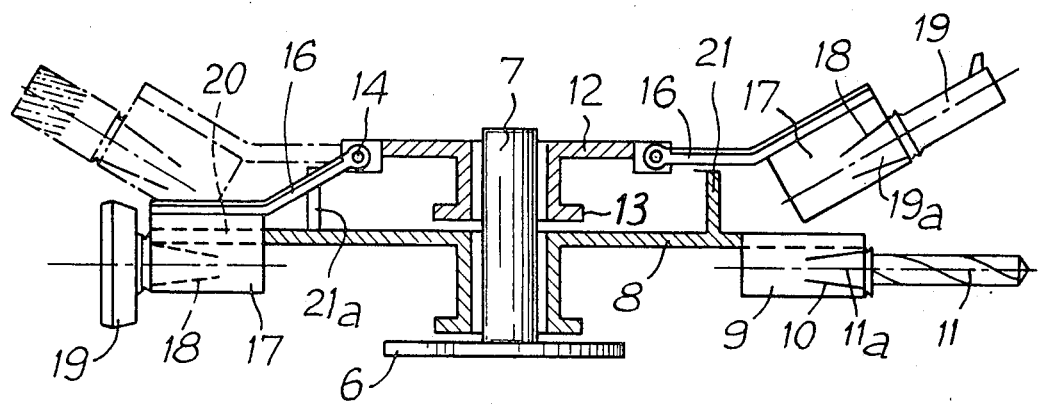
FIG. 3 is an elevational and cross-sectional view along line III—III of FIG. 4 of a tool magazine according to the present invention.
Figure 4:
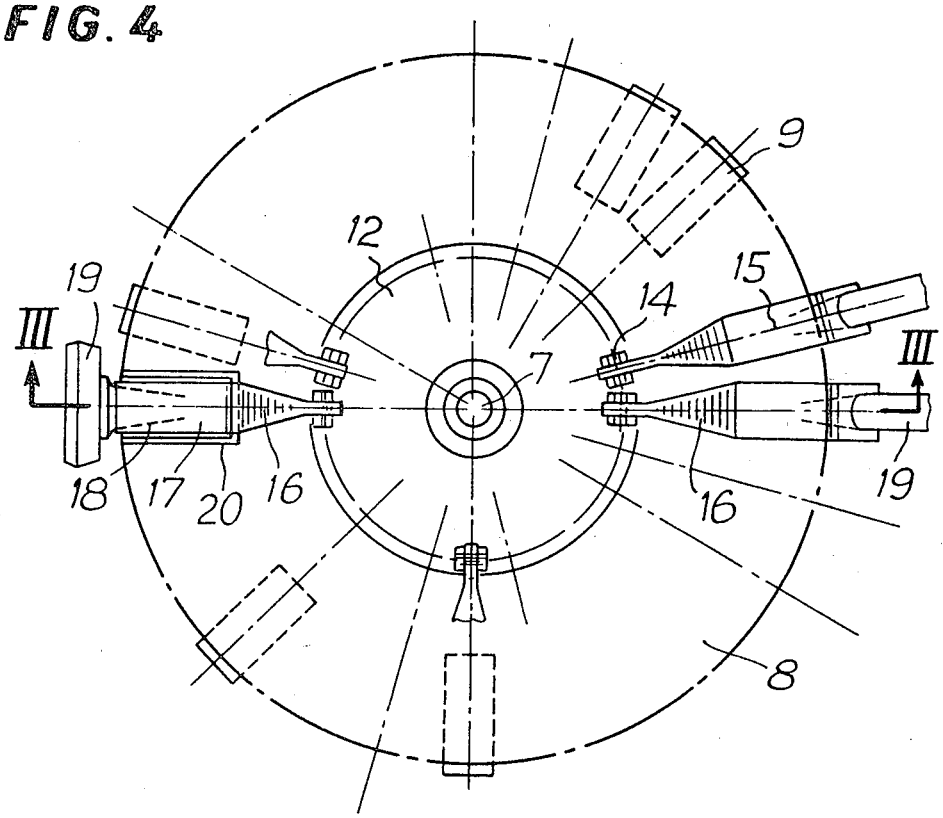
FIG. 4 is a plan view of a tool magazine according to the invention.

FIGS. 3 and 4 show an embodiment of the tool magazine according to the invention which comprises a base plate 6 supporting a pin 7 on which is rotatably mounted a main circular disc 8, which is provided on its periphery with a series of casings 9 presenting housings 10 in which are engaged the shanks 11a of tools 11. Above the said main disc 8, a secondary disc 12 is mounted for rotation about the same pin which secondary disc is separated from the disc 8 by a cross-piece 13. On the periphery of the secondary disc 12 are pivotally mounted about axes 14 perpendicular to the radii 15 of the disc 12, bent supporting rods 16 on which are fixed casings 17 provided with housings 18 in which are engaged the shanks 19a of the tools 19.

A circular wall 21 is provided on the main disc 8, against which wall rest the rods 16 and which wall comprises an opening 21a to allow the passage of the rod when said latter is lowered i.e. when the tool housing is in use.

In the wall of the main disc 8 is provided an opening 20 which occupies the place of one of the casings 9 normally provided on the disc, the said opening, when in the tool changing position, being designed to receive one of the casings 17 fitted with a tool 19 as illustrated on the lefthand side of FIGS. 3 and 4. The tool-holding casings 17 which are in the raised position as illustrated in the righthand side of FIG. 3, are brought above the opening 20 and pivot about the axis 14 in order to be lowered and to be engaged in the opening 20 in the tool-changing position to allow the release or the loading of a tool in the upper magazine. If the support rod and the casing are not lowered down, the lower magazine can work by way of the casings 9 just as if it were the only one.

The discs 8 and 12 are selectively driven in rotation by at least one driving member and by a transmission member not shown in the drawing.

In the same way, the vertical movement of the supporting members 16 and of the casings 17 is controlled by at least one driving member and one transmission means not shown in the drawings.

The invention is not limited to the description given hereinabove and of course modifications can be made thereto without departing from its scope or its spirit.

What is claimed is:

1. A tool magazine for an automatic tool-changing device, comprising:

(a) a first substantially circular disc mounted for rotation about a magazine axis, said first disc having on the periphery thereof a plurality of first tool-receiving housings, the axes of said first housings being arranged substantially on radii of said first disc;

(b) a second substantially circular disc mounted for rotation about said magazine axis;

(c) a plurality of second tool-receiving housings pivotally mounted on said second disc, the axes of said second housings being arranged substantially on radii of said second disc, said second housings further being pivotable about respective axes substantially perpendicular to said second radii; and (d) an opening on the periphery of said first disc wherein a first housing would normally be positioned for selectively receiving a second housing therein.

2. A tool magazine as defined in claim 1 wherein said second disc is positioned above said first disc.

3. A tool magazine as defined in claim 2 including a pin and wherein said discs are mounted coaxially on said pin, and a cross-piece separating said discs.

4. A tool magazine as defined in claim 1 wherein the opening in said first disc is adapted to be rotated to a tool-changing station.

5. A tool magazine as defined in claim 1 including a plurality of bent rods, each rod supporting a second housing, a substantially circular wall having an opening therein, said second housings resting on said wall and being adapted to selectively be lowered into said wall opening.

6. A tool magazine as defined in claim 5 wherein said wall opening and the opening in said first disc are coextensive.

7. A tool magazine as defined in claim 6 wherein said wall is formed on said first disc.

8. A tool magazine as defined in claim 1 wherein said second disc is rotatable relative to said first disc.

* * * * *